(12) United States Patent
Xia et al.

(10) Patent No.: US 9,680,988 B2
(45) Date of Patent: Jun. 13, 2017

(54) METHOD FOR CONFIGURING REFERENCE SIGNAL, BASE STATION AND USER EQUIPMENT

(71) Applicant: HUAWEI TECHNOLOGIES CO., LTD., Shenzhen, Guangdong (CN)

(72) Inventors: Liang Xia, Shenzhen (CN); Kunpeng Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 184 days.

(21) Appl. No.: 14/611,548

(22) Filed: Feb. 2, 2015

(65) Prior Publication Data
US 2015/0146542 A1   May 28, 2015

Related U.S. Application Data

(63) Continuation of application No. PCT/CN2012/079572, filed on Aug. 2, 2012.

(51) Int. Cl.
| | |
|---|---|
| *H04M 3/26* | (2006.01) |
| *H04L 5/00* | (2006.01) |
| *H04W 24/02* | (2009.01) |

(52) U.S. Cl.
CPC .......... *H04M 3/26* (2013.01); *H04L 5/0032* (2013.01); *H04L 5/0048* (2013.01); *H04L 5/0053* (2013.01); *H04W 24/02* (2013.01)

(58) Field of Classification Search
CPC ... H04L 5/0032; H04L 5/0048; H04L 5/0053; H04W 72/04; H04W 72/0406; H04W 72/042; H04W 24/02; H04B 7/024
See application file for complete search history.

(56) References Cited

U.S. PATENT DOCUMENTS

| | | |
|---|---|---|
| 2011/0103250 A1 | 5/2011 | Li et al. |
| 2011/0124347 A1 | 5/2011 | Chen et al. |
| | (Continued) | |

FOREIGN PATENT DOCUMENTS

| | | |
|---|---|---|
| CN | 101272608 A | 9/2008 |
| CN | 101541029 A | 9/2009 |
| | (Continued) | |

OTHER PUBLICATIONS

Office Action in corresponding Chinese Patent Application No. 201280004299.7 (Oct. 25, 2016).

*Primary Examiner* — Paul H Masur
(74) *Attorney, Agent, or Firm* — Leydig, Voit & Mayer, Ltd.

(57) ABSTRACT

The embodiments of the present invention provide a method for configuring a reference signal, a base station and a user equipment. The method includes: receiving, by a first base station, candidate reference signal configuration information of a second base station transmitted by the second base station, and/or candidate reference signal configuration information of the first base station transmitted by an operation and maintenance entity (OAM); and configuring, by the first base station, a reference signal for a user equipment (UE) according to the candidate reference signal configuration information of the second base station, and/or, configuring, by the first base station, a reference signal for a UE according to the candidate reference signal configuration information of the first base station.

14 Claims, 4 Drawing Sheets

---

A first base station receives candidate reference signal configuration information of a first base station transmitted by an OAM — 401

A first base station acquires a use set in the candidate reference signal configuration information of the first base station, selects at least one piece of the reference signal configuration information from the use set and transmits the at least one piece of the reference signal configuration information to a UE — 402

A first base station acquires a non-use set in the candidate reference signal configuration information of the first base station and transmits to the UE reference signal configuration information which is outside the non-use set and includes at least one reference signal configuration — 403

(56) References Cited

U.S. PATENT DOCUMENTS

| | | | |
|---|---|---|---|
| 2012/0002596 A1 | 1/2012 | Kim et al. | |
| 2013/0010707 A1* | 1/2013 | Gaal | H04L 5/003 370/329 |
| 2013/0033998 A1* | 2/2013 | Seo | H04W 24/00 370/252 |
| 2013/0053078 A1* | 2/2013 | Barbieri | H04B 7/024 455/509 |
| 2013/0148515 A1* | 6/2013 | Ribeiro | H04L 5/0094 370/252 |
| 2013/0272132 A1* | 10/2013 | Heo | H04W 28/02 370/236.2 |
| 2015/0071187 A1 | 3/2015 | Chen et al. | |
| 2015/0139151 A1 | 5/2015 | Seo et al. | |

FOREIGN PATENT DOCUMENTS

| | | |
|---|---|---|
| CN | 102056309 A | 5/2011 |
| CN | 102291223 A | 12/2011 |
| CN | 102340382 A | 2/2012 |
| WO | WO 2010124241 A2 | 10/2010 |
| WO | WO 2011079294 A1 | 6/2011 |
| WO | WO 2011122833 A2 | 10/2011 |
| WO | WO 2012096476 A2 | 7/2012 |

\* cited by examiner

METHOD FOR CONFIGURING REFERENCE SIGNAL, BASE STATION AND USER EQUIPMENT

CROSS-REFERENCE TO RELATED APPLICATIONS

This application is a continuation of International Patent Application No. PCT/CN2012/079572, filed on Aug. 2, 2012, which is hereby incorporated by reference in its entirety.

TECHNICAL FIELD

The present invention relates to the technical field of communication technologies and, in particular, to a method for configuring a reference signal, a base station and a user equipment.

BACKGROUND

In a long term evolution-advanced (LTE-A) communications system, an evolved nodeB (eNB) transmits to a user equipment (UE) a downlink demodulation reference signal (DMRS). The UE performs channel estimation by utilizing the downlink DMRS, and further performs data demodulation. The eNB also transmits to the UE a channel-state information reference signal (CSI-RS), the UE performs channel estimation by utilizing the CSI-RS, and further performs channel-state information feedback. Where, a parameter in a DMRS initialization sequence and a parameter in a CSI-RS initialization sequence are configured for the UE by the eNB via a higher layer signaling.

In addition, the eNB will configure other configuration information of the CSI-RS and an uplink reference signal for the UE via a higher layer signaling. Where, other configuration information of the CSI-RS includes at least one of the parameters as follows: the number of CSI-RS ports, a reference signal pattern, a period and a subframe offset, a ratio of energy per resource element (EPRE) of a physical downlink shared channel (PDSCH) to EPRE of a CSI-RS, etc. The uplink reference signal includes at least one of the parameters as follows: an uplink demodulation reference signal, a sounding reference signal (SRS), etc.

Nevertheless, there is no solution regarding how the eNB configures the suitable reference signal for the UE.

SUMMARY

Embodiments of the present invention provide a method for configuring a reference signal, a base station and a user equipment, which provide a solution of configuring a reference signal for a UE. The technical solution is as follows:

In a first respect, a method for configuring a reference signal is provided, the method includes:

receiving, by a first base station, candidate reference signal configuration information of a second base station transmitted by the second base station, and/or candidate reference signal configuration information of the first base station transmitted by an operation and maintenance entity (OAM); and configuring, by the first base station, a reference signal for a user equipment (UE) according to the candidate reference signal configuration information of the second base station, and/or, configuring a reference signal for a UE according to the candidate reference signal configuration information of the first base station.

In a first implementation manner, the configuring, by the first base station, the reference signal for the UE according to the candidate reference signal configuration information of the second base station, comprises:

acquiring, by the first base station, a use set in the candidate reference signal configuration information of the second base station, selecting at least one piece of the reference signal configuration information from the use set and transmitting the at least one piece of the reference signal configuration information to the UE, wherein the use set comprises a set of reference signal configuration information the second base station requires the first base station to use and/or permits the first base station to use;

and/or, acquiring, by the first base station, a non-use set in the candidate reference signal configuration information of the second base station and transmitting to the UE reference signal configuration information which is outside the non-use set and comprises at least one reference signal configuration, wherein the non-use set is a set of reference signal configuration information the second base station requires the first base station not to use.

In a second implementation manner, the configuring the reference signal for the UE according to the candidate reference signal configuration information of the first base station, comprises:

acquiring, by the first base station, a use set in the candidate reference signal configuration information of the first base station, selecting at least one piece of the reference signal configuration information from the use set and transmitting the at least one piece of the reference signal configuration information to the UE, wherein the use set is a set of available reference signal configuration information configured for the first base station by the OAM;

and/or acquiring, by the first base station, a non-use set in the candidate reference signal configuration information of the first base station and transmitting to the UE reference signal configuration information which is outside the non-use set and comprises at least one reference signal configuration, wherein the non-use set is a set of unavailable reference signal configuration information configured for the first base station by the OAM.

In a third implementation manner, the configuring, by the first base station, the reference signal for the user equipment (UE) according to the candidate reference signal configuration information of the second base station, and configuring the reference signal for the UE according to the candidate reference signal configuration information of the first base station, comprises:

acquiring, by the first base station, a first use set in the candidate reference signal configuration information of the first base station and a second use set in the candidate reference signal configuration information of the second base station, selecting at least one piece of reference signal configuration information from the first use set and the second use set and transmitting the at least one piece of the reference signal configuration information to the UE, wherein the first use set is a set of available reference signal configuration information configured for the first base station by the OAM, the second use set comprises a set of reference signal configuration information the second base station requires the first base station to use and/or permits the first base station to use;

and/or, acquiring, by the first base station, a first non-use set in the candidate reference signal configuration information of the first base station and a second non-use set in the candidate reference signal configuration information of the second base station, and transmitting to the UE reference signal configuration information which is outside the first non-use set and the second non-use set and comprises at least one reference signal configuration, wherein, the first non-use set is a set of unavailable reference signal configuration information configured for the first base station by the OAM, the second non-use set is a set of reference signal configuration information the second base station requires the first base station not to use.

In a forth implementation manner, the selecting the at least one piece of the reference signal configuration information from the first use set and the second use set and transmitting the at least one piece of the reference signal configuration information to the UE comprises:

taking a union of the first use set and the second use set; and selecting the at least one piece of reference signal configuration information from the union and transmitting the at least one piece of reference signal configuration information to the UE.

In a fifth implementation manner, the transmitting to the UE the reference signal configuration information which is outside the first non-use set and the second non-use set and comprises the at least one reference signal configuration, comprises:

taking a union of the first use set and the second use set; and transmitting to the UE the reference signal configuration information which is outside the union and comprises the at least one reference signal configuration.

In a sixth implementation manner, after the receiving, by the first base station, the candidate reference signal configuration information of the second base station transmitted by the second base station, the method further comprises:

transmitting, by the first base station, the received candidate reference signal configuration information of the second base station to the UE.

In a seventh implementation manner, the transmitting, by the first base station, the received candidate reference signal configuration information of the second base station to the UE, comprises:

transmitting, by the first base station, the received candidate reference signal configuration information of the second base station to a UE simultaneously served by the first base station and the second base station.

In an eighth implementation manner, the candidate reference signal configuration information comprises at least one of following:

a candidate set of a downlink demodulation reference signal (DMRS) initialization sequence;

a candidate set of a channel-state information reference signal (CSI-RS) initialization sequence;

a candidate set of a CSI-RS resource configuration;

a CSI-RS power candidate configuration;

a candidate basic sequence configuration of an uplink reference signal;

a candidate sequence hopping configuration of an uplink reference signal;

a candidate orthogonal code configuration of an uplink reference signal;

a candidate set of a data scrambling initialization sequence.

In a ninth implementation manner, the candidate reference signal configuration information is candidate reference signal configuration information of a designated time-frequency resource set, and the time-frequency resource set comprises a resource block set and/or a subframe set.

In a second respect, a method for configuring a reference signal is provided, the method includes:

receiving, by a user equipment (UE), reference signal configuration information transmitted by a first base station according to candidate reference signal configuration information of a second base station and/or candidate reference signal configuration information of the first base station;

wherein the candidate reference signal configuration information of the second base station is transmitted to the first base station by the second base station, and the candidate reference signal configuration information of the first base station is transmitted to the first base station by an operation and maintenance entity (OAM).

In a first implementation manner, after the receiving, by the UE, the reference signal configuration information transmitted by the first base station according to the candidate reference signal configuration information of the second base station and/or the candidate reference signal configuration information of the first base station, the method further comprises:

receiving, by the UE, the candidate reference signal configuration information of the second base station transmitted by the first base station.

In a third respect, a method for generating a data scrambling initialization sequence is provided, the method includes:

receiving, by a user equipment (UE), a configuration parameter of a data scrambling initialization sequence transmitted by a base station, and generates the data scrambling initialization sequence according to the configuration parameter of the initialization sequence; or determining, by the UE, whether a configuration parameter of a data scrambling initialization sequence transmitted by a base station is acquired; if the configuration parameter of the data scrambling initialization sequence transmitted by the base station is not acquired by the UE, taking, by the UE, a physical-layer cell identity (PCI) as the configuration parameter of the data scrambling initialization sequence and generate the data scrambling initialization sequence according to the configuration parameter of the initialization sequence.

In a forth respect, a base station is provided, the base station includes:

a receiving module, configured to receive candidate reference signal configuration information of a second base station transmitted by the second base station, and/or the candidate reference signal configuration information of the base station transmitted by an operation and maintenance entity (OAM); and a configuration module, configured to configure a reference signal for a user equipment (UE) according to the candidate reference signal configuration information of the second base station received by the receiving module, and/or, configure a reference signal for a UE according to the candidate reference signal configuration information of the base station received by the receiving module.

In a first implementation manner, the configuration module comprises:

a first configuration unit, configured to acquire a use set in the candidate reference signal configuration information of the second base station, select at least one piece of reference signal configuration information from the use set and transmit to the at least one piece of reference signal configuration information to the UE, wherein the use set comprises a set of reference signal configuration information the second base station requires the base station to use and/or permits the base station to use;

and/or, a second configuration unit, configured to acquire a non-use set in the candidate reference signal configuration information of the second base station and transmit to the UE reference signal configuration information which is outside the non-use set and comprises at least one reference signal configuration, wherein the non-use set is a set of reference signal configuration information the second base station requires the base station not to use.

In a second implementation manner, the configuration module comprises:

a third configuration unit, configured to acquire a use set in the candidate reference signal configuration information of the base station, select at least one piece of reference signal configuration information in the use set and transmit the at least one piece of reference signal configuration information to the UE, wherein the use set is a set of available reference signal configuration information configured for the base station by the OAM;

and/or, a forth configuration unit, configured to acquire a non-use set in the candidate reference signal configuration information of the base station and transmit to the UE reference signal configuration information which is outside the non-use set and comprises at least one reference signal configuration, wherein the non-use set is a set of unavailable reference signal configuration information configured for the base station by the OAM.

In a third implementation manner, the configuration module comprises:

a fifth configuration unit, configured to acquire a first use set in the candidate reference signal configuration information of the base station and a second use set in the candidate reference signal configuration information of the second base station, select at least one piece of reference signal configuration information from the first use set and the second use set and transmit the at least one piece of the candidate reference signal configuration information to the UE, wherein, the first use set is a set of available reference signal configuration information configured for the base station by the OAM, the second use set comprises a set of reference signal configuration information the second base station requires the base station to use and/or permits the base station to use;

and/or, a sixth configuration unit, configured to acquire a first non-use set in the candidate reference signal configuration information of the base station and a second non-use set in the candidate reference signal configuration information of the second base station, and transmit to the UE reference signal configuration information which is outside the first non-use set and the second non-use set and comprises at least one reference signal configuration, wherein, the first non-use set is a set of unavailable reference signal configuration information configured for the base station by the OAM, the second non-use set is a set of reference signal configuration information the second base station requires the base station not to use.

In a forth implementation manner, the base station further comprises:

a notification module, configured to transmit the candidate reference signal configuration information of the second base station received by the receiving module to the UE.

In a fifth implementation manner, the notification module is specifically configured to: transmit the candidate reference signal configuration information of the second base station received by the receiving module to a UE simultaneously served by the base and the second base station.

In a fifth respect, a base station is provided, the base station comprises:

a receiver, configured to receive candidate reference signal configuration information of a second base station transmitted by the second base station, and/or candidate reference signal configuration information of the base station transmitted by an operation and maintenance entity (OAM);

a processor, configured to generate a reference signal for a user equipment (UE) according to the candidate reference signal configuration information of the second base station received by the receiver, and/or, generate a reference signal for a UE according to the candidate reference signal configuration information of the base station received by the receiver; and a transmitter, configured to transmit the reference signal generated by the processor to the UE.

In a first implementation manner, the processor is configured to acquire a use set in the candidate reference signal configuration information of the second base station received by the receiver, and select at least one piece of reference signal configuration information from the use set, wherein the use set comprises a set of reference signal configuration information the second base station requires the base station to use and/or permits the base station to use; the transmitter is configured to transmit the at least one piece of reference signal configuration information selected by the processor to the UE;

and/or, the processor is configured to acquire a non-use set in the candidate reference signal configuration information of the second base station received by the receiver, and select reference signal configuration information which is outside the non-use set and comprises at least one reference signal configuration, wherein the non-use set is a set of reference signal configuration information the second base station requires the base station not to use; the transmitter is configured to transmit the reference signal configuration information which comprises the at least one reference signal configuration and is selected by the processor to the UE.

In a second implementation manner, the processor is configured to acquire a use set in the candidate reference signal configuration information of the base station received by the receiver, and select at least one piece of reference signal configuration information from the use set, wherein the use set is a set of available reference signal configuration information configured for the base station by the OAM; the transmitter is configured to transmit the at least one piece of reference signal configuration information selected by the processor to the UE;

and/or, the processor is configured to acquire a non-use set in the candidate reference signal configuration information of the base station received by the receiver, and select reference signal configuration information which is outside the non-use set and comprises at least one reference signal configuration, wherein the use set is a set of unavailable reference signal configuration information configured for the base station by the OAM; the transmitter is configured to transmit the reference signal configuration information which comprises the at least one reference signal configuration and is selected by the processor to the UE.

In a third implementation manner, the processor is configured to acquire both a first use set in the candidate reference signal configuration information of the base station and a second use set in the candidate reference signal configuration information of the second base station which are received by the receiver, and select at least one piece of reference signal configuration information from the first use set and the second use set, wherein the first use set is a set of available reference signal configuration information configured for the base station by the OAM, and the second use set comprises a set of reference signal configuration information the second base station requires the base station to use and/or permits the base station to use; the transmitter is configured to transmit the at least one piece of reference signal configuration information selected by the processor to the UE;

and/or, the processor is configured to acquire both a first non-use set in the candidate reference signal configuration information of the base station and a second non-use set in the candidate reference signal configuration information of the second base station which are received by the receiver, and select reference signal configuration information which is outside the first non-use set and the second non-use set and comprises at least one reference signal configuration, wherein, the first non-use set is a set of unavailable reference signal configuration information configured for the base station by the OAM, and the second non-use set is a set of reference signal configuration information the second base station requires the base station not to use; the transmitter is configured to transmit the reference signal configuration information which comprises the at least one reference signal configuration and is selected by the processor to the UE.

In a forth implementation manner, the transmitter is further configured to transmit the candidate reference signal configuration information of the second base station received by the receiver to the UE.

In a fifth implementation manner, the transmitter is configured to transmit the candidate reference signal configuration information of the second base station received by the receiver to a UE simultaneously served by the base station and the second base station.

In a sixth respect, a user equipment is provided, the user equipment includes:

a receiving module, configured to receive reference signal configuration information transmitted by a first base station according to candidate reference signal configuration information of a second base station and/or candidate reference signal configuration information of the first base station; and a processing module, configured to acquire a reference signal according to the candidate reference signal configuration information which is transmitted by the first base station according to the candidate reference signal configuration information of the second base station and/or the reference signal configuration information of the first base station and is received by the receiving module;

wherein the candidate reference signal configuration information of the second base station is transmitted to the first base station by the second base station, and the candidate reference signal configuration information of the first base station is transmitted to the first base station by an operation and maintenance entity (OAM).

In an implementation manner, the receiving module is further configured to receive the candidate reference signal configuration information of the second base station transmitted by the first base station, after receiving the reference signal configuration information transmitted by the first base station according to the candidate reference signal configuration information of the second base station and/or the candidate reference signal configuration information of the first base station.

In a seventh respect, a user equipment (UE) is provided, the UE includes:

a receiving module, configured to receive a configuration parameter of a data scrambling initialization sequence transmitted by a base station; and a first generating module, configured to generate the data scrambling initialization sequence according to the configuration parameter of the initialization sequence received by the receiving module;

or, the UE comprises:

a determining module, configured to determine whether a configuration parameter of a data scrambling initialization sequence transmitted by a base station is acquired; and a second generating module, configured to take a physical-layer cell identity (PCI) as the configuration parameter of the data scrambling initialization sequence and generate the data scrambling initialization sequence according to the configuration parameter of the initialization sequence, if the determining module determines that the configuration parameter of the data scrambling initialization sequence transmitted by the base station is not acquired by the UE.

In an eighth respect, a user equipment (UE) is provided, the UE includes:

a receiver, configured to receive a configuration parameter of a data scrambling initialization sequence transmitted by a base station; and a first processor, configured to generate the data scrambling initialization sequence according to the configuration parameter of the initialization sequence received by the receiving module;

or, the UE comprises:

a second processor, configured to determine whether a configuration parameter of a data scrambling initialization sequence transmitted by a base station is acquired, if it is determined that the configuration parameter of the data scrambling initialization sequence transmitted by the base station is not acquired by the UE, take a physical-layer cell identity (PCI) as the configuration parameter of the data scrambling initialization sequence and generate the data scrambling initialization sequence according to the configuration parameter of the initialization sequence.

Beneficial effects of the technical solutions provided by embodiments of the present invention are: a first base station receives candidate reference signal configuration information of a second base station transmitted by the second base station, and/or, candidate reference signal configuration information of the first base station transmitted by an OAM, and configures a reference signal for a UE according to the received candidate reference signal configuration information, thereby providing a solution of configuring a reference signal for a UE. In addition, the configuration is performed based on the candidate reference signal configuration information of the second base station and/or the candidate reference signal configuration information of the first base station, thus a suitable reference signal can be configured for a UE, thereby achieving a good configuration result.

BRIEF DESCRIPTION OF DRAWINGS

In order to make the technical solutions in embodiments of the present invention or in the prior art more clear, the accompanying drawings used in the description of embodiments of the present invention or the prior art are briefly described hereunder. Obviously, the described drawings are

DESCRIPTION OF EMBODIMENTS

Figure 1:
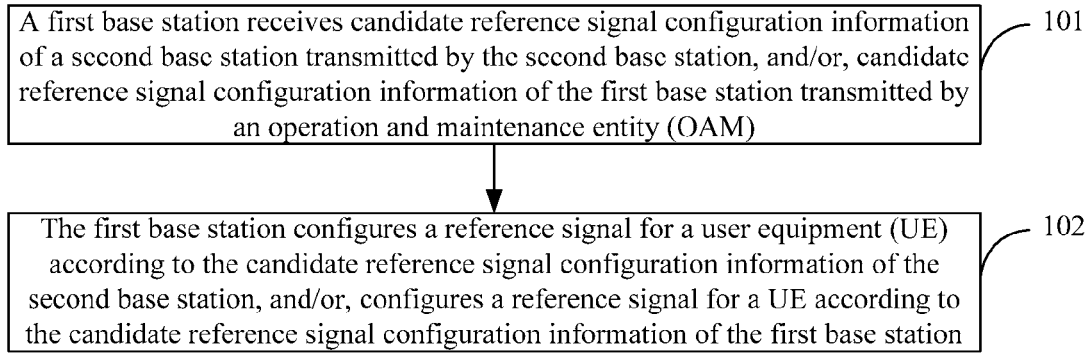
FIG. 1 is a flow diagram of a method for configuring a reference signal according to an embodiment of the present invention.

In order to make the objectives, features, and advantages of embodiments of the present invention more clear, embodiments of the present invention are hereinafter described in further detail with reference to the accompanying drawings.

Embodiments of the present invention relate to candidate reference signal configuration information, which is the reference information when a base station configures a reference signal to a UE. The candidate reference signal configuration information may include at least one of the following:

a candidate set of a downlink demodulation reference signal (DMRS) initialization sequence;

a candidate set of a channel-state information reference signal (CSI-RS) initialization sequence;

a candidate set of a CSI-RS resource configuration;

a CSI-RS power candidate configuration;

a candidate basic sequence configuration of an uplink reference signal;

a candidate sequence hopping configuration of an uplink reference signal;

a candidate orthogonal code configuration of an uplink reference signal;

a candidate set of a data scrambling initialization sequence.

Where, a candidate set of a CSI-RS resource configuration includes: a reference signal pattern configuration, a CSI-RS period and a subframe offset. The uplink reference signal includes: an uplink DMRS and a SRS.

The candidate reference signal configuration information in embodiments of the present invention, specifically, may be the candidate reference signal configuration information of a designated time-frequency resource set, and the time-frequency resource set includes an resource block (RB) set and/or a subframe set.

According to embodiments of the present invention, the DMRS initialization sequence is:

$$c_{init}=(\lfloor n_s/2 \rfloor+1)\cdot(2X+1)\cdot 2^{16}+n_{SCID};$$

Where, $n_s$ is a label of a time slot in a radio frame (RF), $n_{SCID}$ is a scrambling ID, X is dynamically selected from a candidate set $\{x(0), x(1), \ldots, x(N-1)\}$, where $x(n)$ ($0 \leq n < N$) is configured for a UE by a base station via a higher layer signaling, for example, $x(n)$ is configured for a UE by a base station via a UE specialized radio resource control (RRC) signaling.

In embodiments of the present invention, the CSI-RS initialization sequence is:

$$c_{init}=2^{10}\cdot(7\cdot(n_s+1)+l+1)\cdot(2\cdot X+1)+2\cdot X+N_{CP};$$

Wherein $n_s$ is a label of a time slot in an RF (Radio Frame, radio frame), l is a number of an OFDM symbol in a time slot, $N_{CP}$ is a cyclic prefix (CP) type ($N_{CP}=0$ or 1), and X is configured for a UE by an eNB via a higher layer signaling, for example, X is configured for a UE by a base station via a UE specialized RRC signaling.

In embodiments of the present invention, a data scrambling initialization sequence is an initialization sequence used for generating a data scrambling, which may be:

$$c_{init} = \begin{cases} n_{RNTI}\cdot 2^{14} + q\cdot 2^{13} + \lfloor n_s/2 \rfloor \cdot 2^9 + X & \text{for PDSCH and/or PUSCH} \\ (\lfloor n_s/2 \rfloor + 1)\cdot(2X+1)\cdot 2^9 + X & \text{for PDCCH} \\ (\lfloor n_s/2 \rfloor + 1)\cdot(2X+1)\cdot 2^{16} + n_{RNTI} & \text{for PUCCH format 2/2a/2b} \end{cases}$$

Where, $n_{RNTI}$ is a number of a radio network temporary identifier (RNTI), q is a number of a code word, q=0 or 1, $n_s$ is a label of a time slot in an RF, and X is configured for a UE by a base station via a higher layer signaling, for example, X is configured for a UE by a base station via a UE specialized RRC signaling.

The technical solution provided by embodiments of the present invention may be applied to any communications system, which includes but is not limited to LTE, WCDMA, etc. The present invention has no limitation on it.

As shown in FIG. 1, an embodiment of the present invention provides a method for configuring a reference signal, including:

101: a first base station receives candidate reference signal configuration information of a second base station transmitted by the second base station, and/or, candidate reference signal configuration information of the first base station transmitted by an operation and maintenance entity (OAM);

102: the first base station configures a reference signal for a user equipment (UE) according to the candidate reference signal configuration information of the second base station, and/or, configures a reference signal for a UE according to the candidate reference signal configuration information of the first base station.

In this embodiment, the candidate reference signal configuration information may be specifically configured for a UE through a UE specialized radio resource control (RRC) signaling.

In this embodiment, the UE refers to any one of UEs served by the first base station, where the first base station may configure the reference signal for each UE, which is served by the first base station itself, according to the received the candidate reference signal configuration information.

According to the aforementioned method provided by the embodiment, a first base station receives candidate reference signal configuration information of a second base station transmitted by the second base station, and/or, candidate reference signal configuration information of the first base station transmitted by an OAM, and configures a reference signal for a UE according to the received candidate reference signal configuration information, thereby providing a solution of configuring a reference signal for a UE. In addition, the configuration is performed based on the candidate reference signal configuration information of the second base station and/or the candidate reference signal configuration information of the first base station, thus a suitable reference signal can be configured for a UE, thereby achieving a good configuration result.

Figure 2:
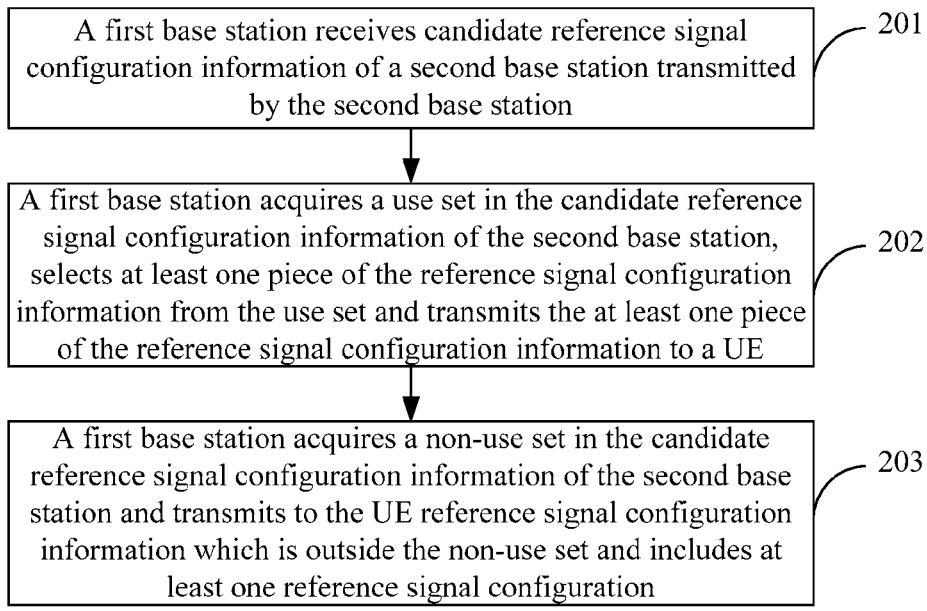
FIG. 2 is a flow diagram of a method for configuring a reference signal according to another embodiment of the present invention.

As shown in FIG. 2, another embodiment of the present invention provides a method for configuring a reference signal, including:

201: a first base station receives candidate reference signal configuration information of a second base station transmitted by the second base station;

202: a first base station acquires a use set in the candidate reference signal configuration information of the second base station, selects at least one piece of the reference signal configuration information from the use set and transmits the at least one piece of the reference signal configuration information to a UE, where the use set includes a set of reference signal configuration information the second base station requires the first base station to use and/or permits the first base station to use;

In this embodiment, the candidate reference signal configuration information of the second base station transmitted by the second base station includes but is not limited to at least one of the following: a use set and a non-use set, where, each set includes at least one piece of reference signal configuration information. The reference signal configuration information in the use set refers to, as for the first base station, reference signal configuration information which can be transmitted to the UE, and the reference signal configuration information in the non-use set refers to, as for a first base station, reference signal configuration information which cannot be transmitted to the UE.

The use set may include a set of reference signal configuration information the second base station requires the first base station to use, and/or, a set of reference signal configuration information the second base station permits the first base station to use. Where, a set of reference signal configuration information the second base station requires the first base station to use refers to a set of reference signal configuration information which is recommended to the first base station by the second base station and must be used by the first base station, and a set of reference signal configuration information the second base station permits the first base station to use refers to that the reference signal configuration information in the set provided by the second base station may or may not be used by the base station upon the decision made by the first base station itself.

Through selecting at least one piece of the reference signal configuration information from the use set by the first base station and transmitting the at least one piece of the reference signal configuration information to the UE, it can be guaranteed that different base stations can use the same reference signal, so that the UE can simultaneously receive data or reference signals transmitted by a plurality of base stations. Specifically, the second base station may take a reference signal, which is used by the second base station and is used for the cooperative transmission between the first base station and the second base station, as a reference signal required to be used by the first base station, so as to facilitate the cooperation between the two base stations. The second base station may take a reference signal, which is used by the second base station and will not affect the UE of the first base station, as a reference signal permitted to be used by the first base station, so as to reduce the signal interference between the two base stations.

203: A first base station acquires a non-use set in the candidate reference signal configuration information of the second base station and transmits to the UE reference signal configuration information which is outside the non-use set and includes at least one reference signal configuration, where the non-use set is a set of reference signal configuration information the second base station requires the first base station not to use.

The non-use set refers to a set of reference signal configuration information which should not be used and is recommended to the first base station by the second base station. The first base station does not use the reference signal configuration information in the set to configure for the UE, and the first base station may use reference signal configuration information outside the non-use set to configure for the UE.

Through transmitting to the UE the reference signal configuration information which is outside the non-use set and includes at least one reference signal configuration, it can be guaranteed that different base stations configure different reference signals for the UE, so as to avoid confusion between reference signals transmitted by different base stations. Specifically, the second base station may take the reference signal, which is used by the second base station and is used for the non-cooperative transmission, as the reference signal required not to be used by the first base station, so as to avoid confusion caused by simultaneously using the reference signal by the first base station and the second base station.

In this embodiment, it is optional to carry out only one of steps 202 and 203 or both of the two steps. When both of the two steps are carried out, no order is required, for example, 202 may be carried out after 203, or may be carried out simultaneously with 203. The present invention has no limitation on it.

In this embodiment, the candidate reference signal configuration information of the second base station transmitted by the second base station may specifically be candidate reference signal configuration information of a designated time-frequency resource set, and the time-frequency resource set may be an RB set and/or a subframe set. For example, the second base station takes a reference signal on a designated RB and/or a reference signal on a designated subframe as the candidate reference signal configuration information. The present invention has no limitation on it.

Figure 3:
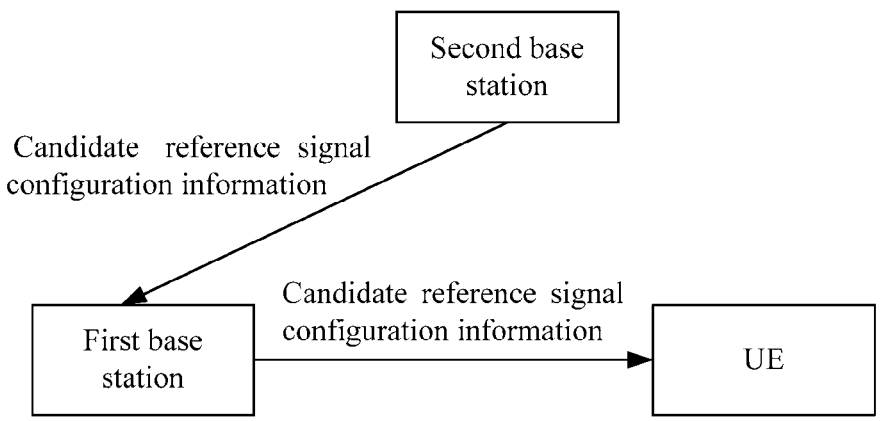
FIG. 3 is a schematic diagram of notifying candidate reference signal configuration information to a UE according to still another embodiment of the present invention.

As shown in FIG. 3, the embodiment further includes steps as follows:

a first base station transmits the received candidate reference signal configuration information of the second base station to the UE. Preferably, the UE in this step refers to the UE simultaneously served by the first base station and the second base station. For example, a UE located at the border between the first base station and the second base station, or, a UE in a state of switching between the first base station and the second base station, etc. The present invention has no limitation on it.

The first base station transmits the received candidate reference signal configuration information of the second base station to the UE simultaneously served by the first base station and the second base station, thus the UE simultaneously served by the first base station and the second base station can timely obtain the candidate reference signal configuration information of the second base station, especially under the circumstances that the UE performs the switch, for example, the UE switches from a cell belonging to the first base station to a cell belonging to the second base station, the UE is able to receive the candidate reference signal configuration information of the second base station before the switch is completed, compared with a mode in which the second base station notifies the UE after the switch, the UE can obtain the reference signal configuration information of the second base station more timely and quickly.

There is also not particular order among the step of transmitting the received candidate reference signal configuration information of the second base station to the UE, step 202 and step 203, which may be carried out simultaneously. The present invention has no limitation on it.

According to the aforementioned method provided by the embodiment, a first base station receives candidate reference signal configuration information of a second base station transmitted by the second base station, and configures a reference signal for a UE according to the received candidate reference signal configuration information, thereby providing a solution of configuring a reference signal for a UE. In addition, the configuration is performed based on the candidate reference signal configuration information of the second base station, thus, a suitable reference signal can be configured for a UE, it can be achieved that the candidate reference signal configurations of different base stations are different or the same, and it is guaranteed that different base stations can use suitable candidate reference signal configurations, and thus the base station is capable of configuring a suitable reference signal for the UE.

Figure 4:
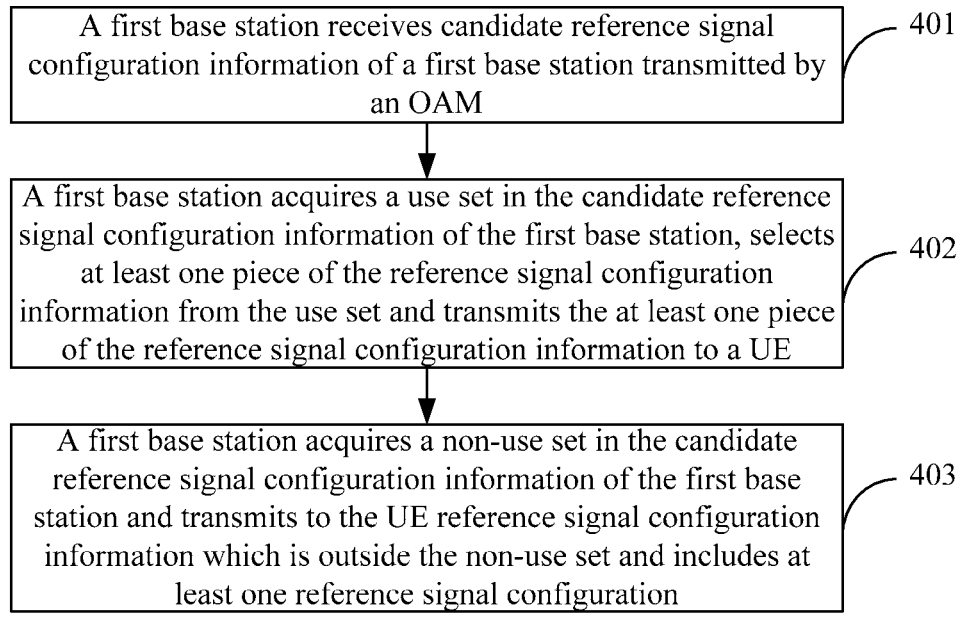
FIG. 4 is a flow diagram of a method for configuring a reference signal according to still another embodiment of the present invention.
Figure 5:
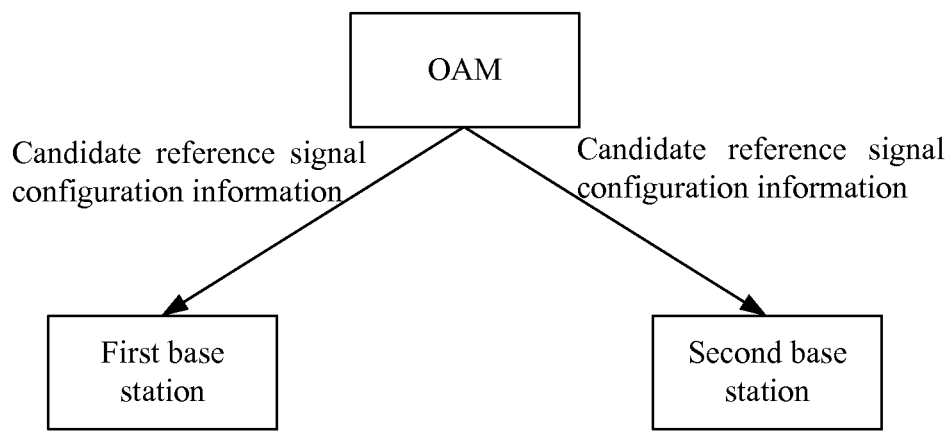
FIG. 5 is a schematic diagram of transmitting candidate reference signal configuration information by an OAM according to another embodiment of the present invention.

As shown in FIG. 4, still another embodiment of the present invention provides a method for configuring a reference signal, including:

401: a first base station receives candidate reference signal configuration information of a first base station transmitted by an operation and maintenance entity (OAM);

In this embodiment, the OAM configures corresponding candidate reference signal configuration information for each base station, and transmits to each base station. Each base station configures a reference signal for a UE according to the candidate reference signal configuration information configured for the base station itself by the OAM after receiving the configured candidate reference signal configuration information. For example, as shown in FIG. 5, an OAM also configures corresponding candidate reference signal configuration information for the second base station and transmits the configured candidate reference signal configuration information to the second base station, so that the second base station can configure the reference signal for the UE according to the received candidate reference signal configuration information configured for the second base station by the OAM.

402: A first base station acquires a use set in the candidate reference signal configuration information of the first base station, selects at least one piece of the reference signal configuration information from the use set and transmits the at least one piece of the reference signal configuration information to a UE, where the use set is a set of available reference signal configuration information configured for the first base station by the OAM;

In this embodiment, the candidate reference signal configuration information of the first base station transmitted by the OAM include, but is not limited to at least one of the following: a use set and a non-use set, where, each set includes at least one piece of reference signal configuration information. The reference signal configuration information in the use set refers to, as for the first base station, reference signal configuration information which can be configured for the UE, and the reference signal configuration information in the non-use set refers to, as for the first base station, reference signal configuration information which cannot be configured for the UE.

Through selecting at least one piece of the reference signal configuration information from the use set by the first base station and transmitting the at least one piece of the reference signal configuration information to the UE, it can be guaranteed that different base stations can use the same reference signal, so that the UE can simultaneously receive data or reference signals transmitted by a plurality of base stations. Specifically, the OAM may take a reference signal which both the first base station and the second base station have and is used for cooperative transmission, and/or, a reference signal which is used by the second base station and will not affect the UE of the first base station, as the use set, so as to reduce the signal interference between the two base stations.

403: A first base station acquires a non-use set in the candidate reference signal configuration information of the first base station and transmits to the UE reference signal configuration information which is outside the non-use set and includes at least one reference signal configuration, where the non-use set is a set of unavailable reference signal configuration information configured for the first base station by the OAM.

The non-use set refers to a set of unavailable reference signal configuration information configured for the first base station by the OAM. The first base station does not use the reference signal configuration information in the set to configure for the UE, and the first base station may use reference signal configuration information outside the non-use set to configure for the UE.

Through transmitting to the UE the reference signal configuration information which is outside the non-use set and includes at least one reference signal configuration, it can be guaranteed that different base stations configure different reference signals for the UE, so as to avoid confusion between reference signals transmitted by different base stations. Where, the OAM may take the reference signal, which is used by the second base station and is used for the non-cooperative transmission, as the non-use set, so as to avoid confusion caused by simultaneously using the reference signal by the first base station and the second base station.

In this embodiment, it is optional to carry out only one of steps 402 and 403 or both of the two steps. When both of the two steps are carried out, no order is required, for example, 402 may be carried out after 403, or may be carried out simultaneously with 403. The present invention has no limitation on it.

In this embodiment, the candidate reference signal configuration information of the first base station transmitted by the OAM may specifically be candidate reference signal configuration information of a designated time-frequency resource set, and the time-frequency resource set may be an RB set and/or a subframe set. For example, the OAM takes a reference signal on a designated RB and/or a reference signal on a designated subframe as the candidate reference signal configuration information of the first base station. The present invention has no limitation on it.

According to the aforementioned method provided by the embodiment, a first base station receives candidate reference signal configuration information of the first base station transmitted by the OAM, and configures a reference signal for a UE according to the received candidate reference signal configuration information, thereby providing a solution of configuring a reference signal for a UE. In addition, since different base stations use the candidate reference signal configuration uniformly allocated by the OAM, it can be achieved that the candidate reference signal configurations of different base stations are different or the same, and it is guaranteed that different base stations can use suitable candidate reference signal configurations, and thus the base station is capable of configuring a suitable reference signal for the UE, thereby achieving the good configuration result.

Figure 6:
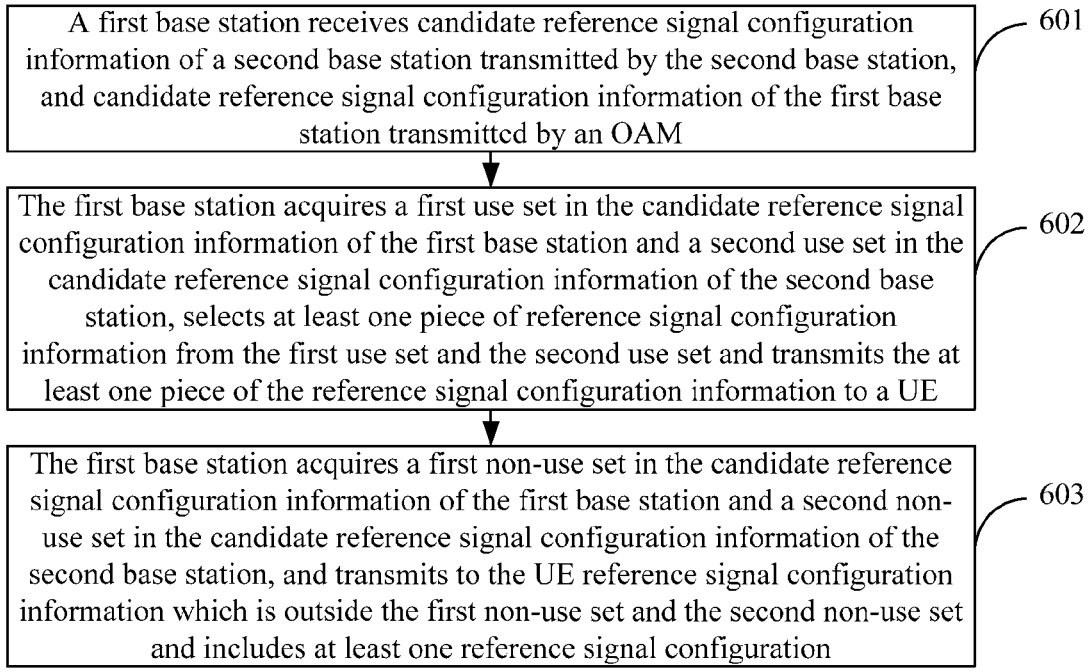
FIG. 6 is a flow diagram of a method for configuring a reference signal according to still another embodiment of the present invention.

As shown in FIG. 6, another embodiment of the present invention further provides a method for configuring a reference signal, including:

601: a first base station receives candidate reference signal configuration information of a second base station transmitted by the second base station, and candidate reference signal configuration information of the first base station transmitted by an OAM;

602: the first base station acquires a first use set in the candidate reference signal configuration information of the first base station and a second use set in the candidate reference signal configuration information of the second base station, selects at least one piece of reference signal configuration information from the first use set and the second use set and transmits the at least one piece of the reference signal configuration information to a UE, where, the first use set is a set of available reference signal configuration information configured for the first base station by the OAM, the second use set includes a set of reference signal configuration information the second base station requires the first base station to use and/or permits the first base station to use;

603: the first base station acquires a first non-use set in the candidate reference signal configuration information of the first base station and a second non-use set in the candidate reference signal configuration information of the second base station, and transmits to the UE reference signal configuration information which is outside the first non-use set and the second non-use set and includes at least one reference signal configuration, where, the first non-use set is a set of unavailable reference signal configuration information configured for the first base station by the OAM, the second non-use set is a set of reference signal configuration information the second base station requires the first base station not to use.

In this embodiment, the candidate reference signal configuration information of the first base station transmitted by the OAM includes but is not limited to at least one of the following: a first use set and a first non-use set, where each set includes at least one piece of reference signal configuration information. The reference signal configuration information in the first use set refers to, as for the first base station, reference signal configuration information which can be configured for the UE, and the reference signal configuration information in the first non-use set refers to, as for the first base station, reference signal configuration information which cannot be configured for the UE. The OAM may take a reference signal which both the first base station and the second base station have and is used for cooperative transmission, and/or, a reference signal which is used by the second base station and will not affect the UE of the first base station, as the use set, so as to guarantee that different base stations can use the same reference signal, please refer to the description in the aforementioned embodiments for detail, which will not be repeated herein.

In this embodiment, the candidate reference signal configuration information of the second base station transmitted by the second base station includes but is not limited to at least one of the following: a second use set and a second non-use set, where each set includes at least one piece of reference signal configuration information. The reference signal configuration information in the second use set refers to, as for the first base station, reference signal configuration information which can be configured for the UE, and the reference signal configuration information in the second non-use set refers to, as for the first base station, reference signal configuration information which cannot be configured for the UE, please refer to the description in the aforementioned embodiments for detail, which will not be repeated herein.

Where, selecting the at least one piece of reference signal configuration information from the first use set and the second use set and transmitting the one piece of the reference signal configuration information to the UE, may includes:

taking a union of the first use set and the second use set; and selecting the at least one piece of reference signal configuration information from the union and transmitting the at least one piece of reference signal configuration information to the UE.

Where, transmitting to the UE the reference signal configuration information which is outside the first non-use set and the second non-use set and includes at least one reference signal configuration, may include:

taking a union of the first non-use set and the second non-use set; and transmitting to the UE the reference signal configuration information which is outside the union and includes at least one reference signal configuration.

In this embodiment, it is optional to carry out only one of steps 602 and 603 or both of the two steps. When both of the two steps are carried out, no order is required, for example, 602 may be carried out after 603, or may be carried out simultaneously with 603. The present invention has no limitation on it.

According to the aforementioned method provided by the embodiment, a first base station receives candidate reference signal configuration information of a second base station transmitted by the second base station, and candidate reference signal configuration information of the first base station transmitted by an OAM, and configures a reference signal for a UE according to the received candidate reference signal configuration information, thereby providing a solution of configuring a reference signal for a UE. In addition, since the configuration is performed based on the candidate reference signal configuration information of the second base station and the candidate reference signal configuration information of the first base station, it can be achieved that the candidate reference signal configurations of different base stations are different or the same, and it is guaranteed that different base stations can use suitable candidate reference signal configurations, and thus the base station is capable of configuring a suitable reference signal for the UE, thereby achieving the good configuration result.

Still another embodiment of the present invention provides a method for configuring a reference signal, including:

a user equipment (UE) receives reference signal configuration information transmitted by a first base station according to candidate reference signal configuration information of a second base station and/or candidate reference signal configuration information of the first base station;

where, the candidate reference signal configuration information of the second base station is transmitted to the first base station by the second base station, and the candidate reference signal configuration information of the first base station is transmitted to the first base station by an operation and maintenance entity (OAM).

Furthermore, after the UE receives the reference signal configuration information transmitted by the first base station according to the candidate reference signal configuration information of the second base station and/or the candidate reference signal configuration information of the first base station, the method further includes:

the UE receives the candidate reference signal configuration information of the second base station transmitted by the first base station.

According to the aforementioned method provided by the embodiment, a UE receives a reference signal configuration information transmitted by a first base station according to candidate reference signal configuration information of a second base station and/or candidate reference signal configuration information of the first base station, thereby providing a solution of configuring a reference signal for a UE. In addition, since the configuration is performed based on the candidate reference signal configuration information of the second base station and the candidate reference signal configuration information of the first base station, it can be achieved that the candidate reference signal configurations of different base stations are different or the same, and it is guaranteed that different base stations can use suitable candidate reference signal configurations, and thus the base station is capable of configuring a suitable reference signal for the UE, thereby achieving the good configuration result.

Figure 7:
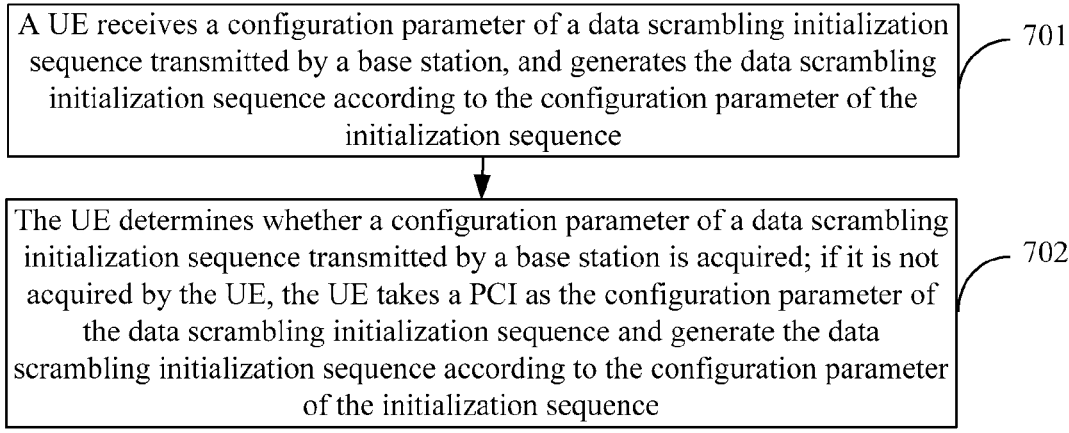
FIG. 7 is a flow diagram of a method for generating a data scrambling initialization sequence according to still another embodiment of the present invention.

As shown in FIG. 7, in order to guarantee that the UE can successfully generate a data scrambling initialization sequence, especially to avoid a case that the UE cannot generate the data scrambling initialization sequence because the UE doesn't acquired a configuration parameter of the data scrambling initialization sequence transmitted by the base station, still another embodiment of the present invention further provides a method for generating a data scrambling initialization sequence, including:

701: a UE receives a configuration parameter of a data scrambling initialization sequence transmitted by a base station, and generates the data scrambling initialization sequence according to the configuration parameter of the initialization sequence; or 702: the UE determines whether a configuration parameter of a data scrambling initialization sequence transmitted by a base station is acquired; if the configuration parameter of the data scrambling initialization sequence transmitted by the base station is not acquired by the UE, the UE takes a physical layer cell ID (PCI) as the configuration parameter of the data scrambling initialization sequence and generate the data scrambling initialization sequence according to the configuration parameter of the initialization sequence.

For example, the UE may take the PCI as the configuration parameter X of the data scrambling initialization sequence, i.e., $X=N_{ID}^{cell}$.

Where, the base station may transmit the configuration parameter of the data scrambling initialization sequence to the UE through a higher layer signaling.

After determining the configuration parameter of the data scrambling initialization sequence, the UE generate the data scrambling initialization sequence according to the configuration parameter of the data scrambling initialization sequence, which may be particularly as follows:

$$c_{init} = \begin{cases} n_{RNTI} \cdot 2^{14} + q \cdot 2^{13} + \lfloor n_s/2 \rfloor \cdot 2^9 + X & \text{for } PDSCH \text{ and/or } PUSCH \\ & \text{and/or } ePDCCH \\ (\lfloor n_s/2 \rfloor + 1) \cdot (2X+1) \cdot 2^9 + X & \text{for } PDCCH \\ (\lfloor n_s/2 \rfloor + 1) \cdot (2X+1) \cdot 2^{16} + n_{RNTI} & \text{for } PUCCH \text{ format } 2/2a/2b \end{cases}$$

Where, X is the configuration parameter of the data scrambling initialization sequence determined by the UE, $n_{RNTI}$ is a number of a radio network temporary identifier (RNTI), q is a number of a code word, q=0 or 1, for an ePDCCH, q may be a fixed number, such as q=0 or q=1, and $n_s$ is a label of a time slot in an RF.

According to the aforementioned method provided by the embodiment, the UE generates the data scrambling initialization sequence according to the configuration parameter of the data scrambling initialization sequence transmitted by the base station, or the UE generates the data scrambling initialization sequence by taking the PCI as the configuration parameter of the data scrambling initialization sequence, thereby guaranteeing that the UE can generate the data scrambling initialization sequence. In addition, through taking the PCI as the configuration parameter of the data scrambling initialization sequence, an effect that different UEs in the same cell use different scrambling codes is achieved.

Figure 8:
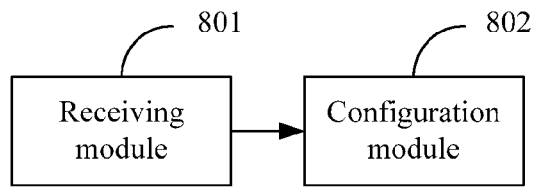
FIG. 8 is a structural diagram of a base station according to another embodiment of the present invention.

As shown in FIG. 8, another embodiment of the present invention provides a base station, including:

a receiving module 801, configured to receive candidate reference signal configuration information of a second base station transmitted by the second base station, and/or the candidate reference signal configuration information of the base station transmitted by an operation and maintenance entity (OAM); and a configuration module 802, configured to configure a reference signal for a user equipment (UE) according to the candidate reference signal configuration information of the second base station received by the receiving module 801, and/or, configure a reference signal for a UE according to the candidate reference signal configuration information of the base station received by the receiving module.

In an implementation manner, a configuration module 802 may include:

a first configuration unit, configured to acquire a use set in the candidate reference signal configuration information of the second base station, select at least one piece of reference signal configuration information from the use set and transmit the at least one piece of reference signal configuration information to the UE, where the use set includes a set of reference signal configuration information the second base station requires the base station to use and/or permits the base station to use;

and/or, a second configuration unit, configured to acquire a non-use set in the candidate reference signal configuration information of the second base station and transmit to the UE reference signal configuration information which is outside the non-use set and includes at least one reference signal configuration, where the non-use set is a set of reference signal configuration information the second base station requires the base station not to use.

In another implementation manner, a configuration module 802 may include:

a third configuration unit, configured to acquire a use set in the candidate reference signal configuration information of the base station, select at least one piece of reference signal configuration information in the use set and transmit the at least one piece of reference signal configuration information to the UE, where the use set is a set of available reference signal configuration information configured for the base station by the OAM;

and/or, a forth configuration unit, configured to acquire a non-use set in the candidate reference signal configuration information of the base station and transmit to the UE reference signal configuration information which is outside the non-use set and includes at least one reference signal configuration, where the non-use set is a set of unavailable reference signal configuration information configured for the base station by the OAM.

In still another implementation manner, a configuration module 802 may include:

a fifth configuration unit configured to acquire a first use set in the candidate reference signal configuration information of the base station and a second use set in the candidate reference signal configuration information of the second base station, select at least one piece of reference signal configuration information from the first use set and the second use set and transmit the at least one piece of the candidate reference signal configuration information to the UE, where, the first use set is a set of available reference signal configuration information configured for the base station by the OAM, the second use set includes a set of reference signal configuration information the second base station requires the base station to use and/or permits the base station to use;

and/or, a sixth configuration unit configured to acquire a first non-use set in the candidate reference signal configuration information of the base station and a second non-use set in the candidate reference signal configuration information of the second base station, and transmit to the UE reference signal configuration information which is outside the first non-use set and the second non-use set and includes at least one reference signal configuration, where, the first non-use set is a set of unavailable reference signal configuration information configured for the base station by the OAM, the second non-use set is a set of reference signal configuration information the second base station requires the base station not to use.

According to the embodiment, the base station may also include:

a notification module, configured to transmit the candidate reference signal configuration information of the second base station received by the receiving module to the UE.

Further, the notification module is specifically configured to: transmit the candidate reference signal configuration information of the second base station received by the receiving module 801 to a UE simultaneously served by the base and the second base station.

According to the base station provided by the embodiment, candidate reference signal configuration information of a second base station transmitted by the second base station, and/or, candidate reference signal configuration information of the base station transmitted by an OAM is received, and a reference signal is configured for a UE according to the received candidate reference signal configuration information, thereby providing a solution of configuring a reference signal for a UE. In addition, the configuration is performed based on the candidate reference signal configuration information of the second base station and/or the candidate reference signal configuration information of the base station, thus a suitable reference signal can be configured for a UE, thereby achieving a good configuration result.

Figure 9:
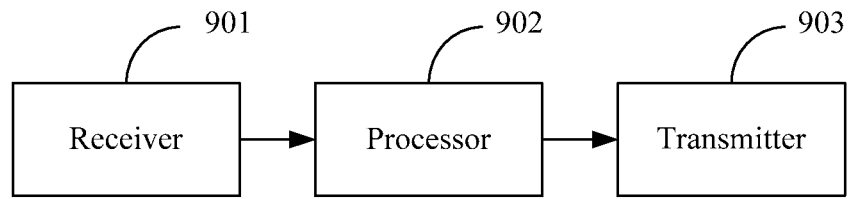
FIG. 9 is a structural diagram of a base station according to still another embodiment of the present invention.

As shown in FIG. 9, still another embodiment of the present invention provides a base station, including:

a receiver 901, configured to receive candidate reference signal configuration information of a second base station transmitted by the second base station, and/or candidate reference signal configuration information of the base station transmitted by an operation and maintenance entity (OAM);

a processor 902, configured to generate a reference signal for a user equipment (UE) according to the candidate reference signal configuration information of the second base station received by the receiver 901, and/or, generate a reference signal for a UE according to the candidate reference signal configuration information of the base station received by the receiver 901; and a transmitter 903, configured to transmit the reference signal generated by the processor 902 to the UE.

A first implementation manner according to the embodiment is as follows:

the processor is configured to acquire a use set in the candidate reference signal configuration information of the second base station received by the receiver, and select at least one piece of reference signal configuration information from the use set, where the use set includes a set of reference signal configuration information the second base station requires the base station to use and/or permits the base station to use; the transmitter is configured to transmit the at least one piece of reference signal configuration information selected by the processor to the UE;

and/or, the processor is configured to acquire a non-use set in the candidate reference signal configuration information of the second base station received by the receiver, and select reference signal configuration information which is outside the non-use set and includes at least one reference signal configuration, where the non-use set is a set of reference signal configuration information the second base station requires the base station not to use; the transmitter is configured to transmit the reference signal configuration information which includes the at least one reference signal configuration and is selected by the processor to the UE.

A second implementation manner according to the embodiment is as follows:

the processor is configured to acquire a use set in the candidate reference signal configuration information of the base station received by the receiver, and select at least one piece of reference signal configuration information from the use set, where the use set is a set of available reference signal configuration information configured for the base station by the OAM; the transmitter is configured to transmit the at least one piece of reference signal configuration information selected by the processor to the UE;

and/or, the processor is configured to acquire a non-use set in the candidate reference signal configuration information of the base station received by the receiver, and select reference signal configuration information which is outside the non-use set and comprises at least one reference signal configuration, where the use set is a set of unavailable reference signal configuration information configured for the base station by the OAM; the transmitter is configured to transmit the reference signal configuration information which includes the at least one reference signal configuration and is selected by the processor to the UE.

A third implementation manner according to the embodiment is as follows:

the processor is configured to acquire both a first use set in the candidate reference signal configuration information of the base station and a second use set in the candidate reference signal configuration information of the second base station which are received by the receiver, and select at least one piece of reference signal configuration information from the first use set and the second use set, where the first use set is a set of available reference signal configuration information configured for the base station by the OAM, and the second use set includes a set of reference signal configuration information the second base station requires the base station to use and/or permits the base station to use; the transmitter is configured to transmit the at least one piece of reference signal configuration information selected by the processor to the UE;

and/or, the processor is configured to acquire both a first non-use set in the candidate reference signal configuration information of the base station and a second non-use set in the candidate reference signal configuration information of the second base station which are received by the receiver, and select reference signal configuration information which is outside the first non-use set and the second non-use set and includes at least one reference signal configuration, where, the first non-use set is a set of unavailable reference signal configuration information configured for the base station by the OAM, and the second non-use set is a set of reference signal configuration information the second base station requires the base station not to use; the transmitter is configured to transmit the reference signal configuration information which includes the at least one reference signal configuration and is selected by the processor to the UE.

A forth implementation manner according to the embodiment is as follows:

the transmitter is further configured to transmit the candidate reference signal configuration information of the second base station received by the receiver to the UE.

Based on the aforementioned forth implementation manner, a fifth implementation manner according to the embodiment is:

the transmitter is configured to transmit the candidate reference signal configuration information of the second base station received by the receiver to a UE simultaneously served by the base station and the second base station.

Where the candidate reference signal configuration information includes at least one of the following:

a candidate set of a downlink demodulation reference signal (DMRS) initialization sequence;

a candidate set of a channel-state information reference signal CSI-RS initialization sequence;

a candidate set of a CSI-RS resource configuration;

a CSI-RS power candidate configuration;

a candidate basic sequence configuration of an uplink reference signal;

a candidate sequence hopping configuration of an uplink reference signal;

a candidate orthogonal code configuration of an uplink reference signal;

a candidate set of a data scrambling initialization sequence.

Where the candidate reference signal configuration information is candidate reference signal configuration information of a designated time-frequency resource set, and the time-frequency resource set comprises a resource block set and/or a subframe set.

According to the base station provided by the embodiment, candidate reference signal configuration information of a second base station transmitted by the second base station, and/or, candidate reference signal configuration information of the base station transmitted by an OAM is received, and a reference signal is configured for a UE according to the received candidate reference signal configuration information, thereby providing a solution of configuring a reference signal for a UE. In addition, the configuration is performed based on the candidate reference signal configuration information of the second base station and/or the candidate reference signal configuration information of the base station, thus a suitable reference signal can be configured for a UE, thereby achieving a good configuration result.

Another embodiment of the present invention provides a user equipment (UE), including:

a receiving module, configured to receive reference signal configuration information transmitted by a first base station according to candidate reference signal configuration information of a second base station and/or candidate reference signal configuration information of the first base station; and a processing module, configured to acquire a reference signal according to the candidate reference signal configuration information which is transmitted by the first base station according to the candidate reference signal configuration information of the second base station and/or the reference signal configuration information of the first base station and is received by the receiving module;

where, the candidate reference signal configuration information of the second base station is transmitted to the first base station by the second base station, and the candidate reference signal configuration information of the first base station is transmitted to the first base station by an operation and maintenance entity (OAM).

Further, the receiving module is further configured to receive the candidate reference signal configuration information of the second base station transmitted by the first base station, after receiving the reference signal configuration information transmitted by the first base station according to the candidate reference signal configuration information of the second base station and/or the candidate reference signal configuration information of the first base station.

According to the UE provided by the embodiment, by receiving a reference signal configuration information transmitted by a first base station according to candidate reference signal configuration information of a second base station and/or candidate reference signal configuration information of the first base station, a solution of configuring a reference signal for a UE is provided. In addition, since the configuration is performed based on the candidate reference signal configuration information of the second base station and the candidate reference signal configuration information of the first base station, it can be achieved that the candidate reference signal configurations of different base stations are different or the same, and it is guaranteed that different base stations can use suitable candidate reference signal configurations, and thus the base station is capable of configuring a suitable reference signal for the UE, thereby achieving the good configuration result.

Figure 10:
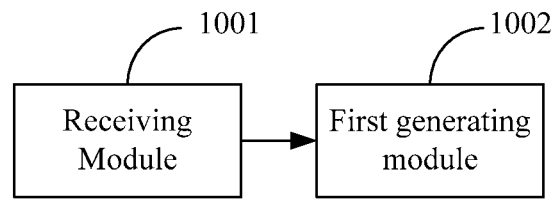
FIG. 10 is a structural diagram of a UE according to still another embodiment of the present invention.
Figure 11:
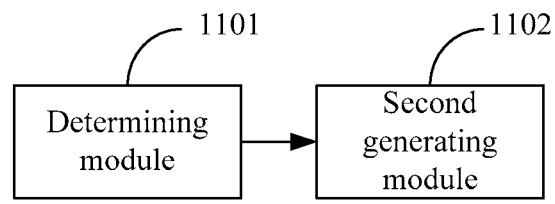
FIG. 11 is a structural diagram of a UE according to another embodiment of the present invention.

As shown in FIG. 10, still another embodiment of the present invention provides a user equipment (UE), including:

a receiving module 1001, configured to receive a configuration parameter of a data scrambling initialization sequence transmitted by a base station; and a first generating module 1002, configured to generate the data scrambling initialization sequence according to the configuration parameter of the initialization sequence received by the receiving module 1001;

or, as shown in FIG. 11, the UE includes:

a determining module 1101, configured to determine whether a configuration parameter of a data scrambling initialization sequence transmitted by a base station is acquired; and a second generating module 1102, configured to take a physical-layer cell identity (PCI) as the configuration parameter of the data scrambling initialization sequence and generate the data scrambling initialization sequence according to the configuration parameter of the initialization sequence, if the determining module 1101 determines that the configuration parameter of the data scrambling initialization sequence transmitted by the base station is not acquired by the UE.

According to the UE provided by the embodiment, the data scrambling initialization sequence is generated according to the configuration parameter of the data scrambling initialization sequence transmitted by the base station, or the data scrambling initialization sequence is generated by taking the PCI as the configuration parameter of the data scrambling initialization sequence, therefore, an effect that different UEs in the same cell use different scrambling codes is achieved.

Figure 12:
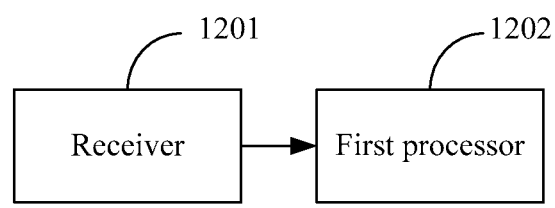
FIG. 12 is a structural diagram of a UE according to still another embodiment of the present invention.

As shown in FIG. 12, still another embodiment of the present invention provides a user equipment (UE), including:

a receiver 1201, configured to receive a configuration parameter of a data scrambling initialization sequence transmitted by a base station; and a first processor 1202, configured to generate a data scrambling initialization sequence according to the configuration parameter of the initialization sequence received by the receiving module;

or, the UE includes:

a second processor, configured to determine whether a configuration parameter of a data scrambling initialization sequence transmitted by a base station is acquired, if it is determined that the configuration parameter of the data scrambling initialization sequence transmitted by the base station is not acquired by the UE, take a physical-layer cell identity (PCI) as the configuration parameter of the data scrambling initialization sequence and generate the data scrambling initialization sequence according to the configuration parameter of the initialization sequence.

According to the UE provided by the embodiment, the data scrambling initialization sequence is generated according to the configuration parameter of the data scrambling initialization sequence transmitted by the base station, or the data scrambling initialization sequence is generated by taking the PCI as the configuration parameter of the data scrambling initialization sequence, therefore, an effect that different UEs in the same cell use different scrambling codes is achieved.

A person of ordinary skill in the art can understand that all or part of steps according to the above embodiments can be implemented by hardware or implemented by related hardware instructed by computer program, where the computer program may be stored in a computer readable storage medium. The aforementioned storage medium may be a read-only memory, a disk, a compact disc, etc.

The aforementioned are only preferable embodiments according to the present invention, rather than limitation of the present invention. Any amendments, equal replacements, or improvements within the spirit and principle of the present invention shall fall within the protection scope of the present invention.

What is claimed is:

1. A method for configuring a reference signal, comprising:

receiving, by a first base station, (a) candidate reference signal configuration information of a second base station transmitted by the second base station, and (b) candidate reference signal configuration information of the first base station transmitted by an operation and maintenance entity (OAM); and configuring, by the first base station, a reference signal for a user equipment (UE) according to the candidate reference signal configuration information of the first and the second base station;

wherein configuring the reference signal for the user equipment (UE) according to the candidate reference signal configuration information of the first and second base stations, comprises one of the following:

(a) acquiring, by the first base station, a first use set in the candidate reference signal configuration information of the first base station and a second use set in the candidate reference signal configuration information of the second base station, selecting at least one piece of reference signal configuration information from the first use set and the second use set and transmitting the at least one piece of the reference signal configuration information to the UE, wherein the first use set is a set of available reference signal configuration information configured for the first base station by the OAM, the second use set comprises a set of reference signal configuration information that the second base station requires the first base station to use and/or permits the first base station to use; and (b) acquiring, by the first base station, a first non-use set in the candidate reference signal configuration information of the first base station and a second non-use set in the candidate reference signal configuration information of the second base station, and transmitting to the UE reference signal configuration information which is outside the first non-use set and the second non-use set and comprises at least one reference signal configuration, wherein, the first non-use set is a set of unavailable reference signal configuration information configured for the first base station by the OAM, the second non-use set is a set of reference signal configuration information that the second base station requires the first base station not to use.

2. The method according to claim 1, wherein selecting the at least one piece of the reference signal configuration information from the first use set and the second use set and transmitting the at least one piece of the reference signal configuration information to the UE comprises:

taking a union of the first use set and the second use set; and selecting the at least one piece of reference signal configuration information from the union and transmitting the at least one piece of reference signal configuration information to the UE.

3. The method according to claim 1, wherein transmitting to the UE the reference signal configuration information which is outside the first non-use set and the second non-use set and comprises the at least one reference signal configuration, comprises:

taking a union of the first use set and the second use set; and transmitting to the UE the reference signal configuration information which is outside the union and comprises the at least one reference signal configuration.

4. The method according to claim 1, wherein after receiving the candidate reference signal configuration information of the second base station transmitted by the second base station, the method further comprises:

transmitting, by the first base station, the received candidate reference signal configuration information of the second base station to the UE.

5. The method according to claim 4, wherein transmitting the received candidate reference signal configuration information of the second base station to the UE, comprises:

transmitting, by the first base station, the received candidate reference signal configuration information of the second base station to a UE simultaneously served by the first base station and the second base station.

6. The method according to claim 1, wherein the candidate reference signal configuration information comprises at least one of following:

a candidate set of a downlink demodulation reference signal (DMRS) initialization sequence;
a candidate set of a channel-state information reference signal (CSI-RS) initialization sequence;
a candidate set of a CSI-RS resource configuration;
a CSI-RS power candidate configuration;
a candidate basic sequence configuration of an uplink reference signal;
a candidate sequence hopping configuration of an uplink reference signal;
a candidate orthogonal code configuration of an uplink reference signal; and
a candidate set of a data scrambling initialization sequence.

7. The method according to claim 1, wherein the candidate reference signal configuration information is candidate reference signal configuration information of a designated time-frequency resource set, and the time-frequency resource set comprises at least one of a resource block set and a subframe set.

8. A method for configuring a reference signal, comprising:

receiving, by a user equipment (UE), reference signal configuration information transmitted by a first base station according to (a) candidate reference signal configuration information of a second base station and (b) candidate reference signal configuration information of the first base station; wherein the candidate reference signal configuration information of the second base station is transmitted to the first base station by the second base station, and the candidate reference signal configuration information of the first base station is transmitted to the first base station by an operation and maintenance entity (OAM); and the reference signal configuration information transmitted by the first base station according to candidate reference signal configuration information of the first and the second base station comprises one of:

(a) at least one piece of reference signal configuration information selected by the first base station from a first use set and a second use set, wherein the first use set is acquired by the first base station in the candidate reference signal configuration information of the first base station and is a set of available reference signal configuration information configured for the first base station by the OAM; and the second use set is acquired by the first base station in the candidate reference signal configuration information of the second base station, and comprises a set of reference signal configuration information that the second base station requires the first base station to use and/or permits the first base station to use; and (b) reference signal configuration information which is outside a first non-use set and a second non-use set and comprises at least one reference signal configuration, wherein the first non-use set is acquired by the first base station in the candidate reference signal configuration information of the first base station, and is a set of unavailable reference signal configuration information configured for the first base station by the OAM; and the second non-use set is acquired by the first base station in the candidate reference signal configuration information of the second base station, and is a set of reference signal configuration information that the second base station requires the first base station not to use.

9. The method according to claim 8, wherein after receiving the reference signal configuration information transmitted by the first base station, the method further comprises:

receiving, by the UE, the candidate reference signal configuration information of the second base station transmitted by the first base station.

10. A base station, comprising:

a receiver, configured to receive (a) candidate reference signal configuration information of another base station transmitted by the another base station, and (b) candidate reference signal configuration information of the base station transmitted by an operation and maintenance entity (OAM);

a processor, configured to generate a reference signal for a user equipment (UE) according to the candidate reference signal configuration information of the base station the another base station; and a transmitter, configured to transmit the reference signal generated by the processor to the UE;

wherein the processor is configured to implement one of:

(a) acquiring both a first use set in the candidate reference signal configuration information of the base station and a second use set in the candidate reference signal configuration information of the another base station which are received by the receiver, and select at least one piece of reference signal configuration information from the first use set and the second use set, wherein the first use set is a set of available reference signal configuration information configured for the base station by the OAM, and the second use set comprises a set of reference signal configuration information the second base station requires the base station to use and/or permits the base station to use; the transmitter is configured to transmit the at least one piece of reference signal configuration information selected by the processor to the UE; and (b) acquiring both a first non-use set in the candidate reference signal configuration information of the base station and a second non-use set in the candidate reference signal configuration information of the another base station which are received by the receiver, and select reference signal configuration information which is outside the first non-use set and the second non-use set and comprises at least one reference signal configuration, wherein, the first non-use set is a set of unavailable reference signal configuration information configured for the base station by the OAM, and the second non-use set is a set of reference signal configuration information the another base station requires the base station not to use; the transmitter is configured to transmit the reference signal configuration information which comprises the at least one reference signal configuration and is selected by the processor to the UE.

11. The base station according to claim 10, wherein
the transmitter is further configured to transmit the candidate reference signal configuration information of the another base station to the UE.

12. The base station according to claim 11, wherein the transmitter is configured to transmit the candidate reference signal configuration information of the another base station to a UE simultaneously served by the base station and the another base station.

13. A user equipment (UE), comprising:
a receiver, configured to receive reference signal configuration information transmitted by a first base station according to (a) candidate reference signal configuration information of a second base station and (b) candidate reference signal configuration information of the first base station; and
a processor, configured to acquire a reference signal according to the candidate reference signal configuration information, the candidate reference signal configuration information is transmitted by the first base station according to (a) the candidate reference signal configuration information of the second base station and (b) the reference signal configuration information of the first base station and is received by the receiver;
wherein the candidate reference signal configuration information of the second base station is transmitted to the first base station by the second base station, and the candidate reference signal configuration information of the first base station is transmitted to the first base station by an operation and maintenance entity (OAM); and
the reference signal configuration information transmitted by the first base station according to candidate reference signal configuration information of the first and the second base station comprises one of:
(a) at least one piece of reference signal configuration information selected by the first base station from a first use set and a second use set, wherein the first use set is acquired by the first base station in the candidate reference signal configuration information of the first base station and is a set of available reference signal configuration information configured for the first base station by the OAM; and the second use set is acquired by the first base station in the candidate reference signal configuration information of the second base station, and comprises a set of reference signal configuration information that the second base station requires the first base station to use and/or permits the first base station to use; and
(b) reference signal configuration information which is outside a first non-use set and a second non-use set and comprises at least one reference signal configuration, wherein the first non-use set is acquired by the first base station in the candidate reference signal configuration information of the first base station, and is a set of unavailable reference signal configuration information configured for the first base station by the OAM; and the second non-use set is acquired by the first base station in the candidate reference signal configuration information of the second base station, and is a set of reference signal configuration information that the second base station requires the first base station not to use.

14. The UE according to claim 13, wherein the receiver is further configured to receive the candidate reference signal configuration information of the second base station transmitted by the first base station, after receiving the reference signal configuration information transmitted by the first base station according to (a) the candidate reference signal configuration information of the second base station and (b) the candidate reference signal configuration information of the first base station.

* * * * *